3,381,050
HYDROCARBON CONVERSION
Robert J. Bodre, La Marque, Tex., assignor to Monsanto Company, St. Louis, Mo., a corporation of Delaware
No Drawing. Filed May 11, 1966, Ser. No. 549,151
10 Claims. (Cl. 260—671)

This invention relates to the alkylation of aromatic hydrocarbons. More particularly, the present invention relates to an improved process for the alkylation of aromatic hydrocarbons and to an improved catalyst therefor.

For several years alkylation of aromatic hydrocarbons has been of great importance in changing aromatic hydrocarbons from one form to other forms more useful in various chemical process and manufacturing industries. Two of the more important processes involve the alkylation of benzene with ethylene or propylene to form ethylbenzene or cumene. Ethylbenzene is utilized in large quantities in dehydrogenation processes for the manufacture of styrene and cumene may be converted to cumene hydroperoxide which is readily decomposed into phenol and acetone. Alkylated aromatics are also of value in many other fields and some are particularly desirable as constituents of high octane aviation fuels and as sources of synthetic detergents.

Among the catalysts which are useful in these alkylation reactions are the aluminum halide-hydrocarbon complex catalysts. These complex catalysts have been used for many years and may be formed in various manners such as by reacting aluminum metal with a hydrogen halide in a hydrocarbon medium so that an aluminum halide is formed in situ which in turn forms a complex with the hydrocarbon. In actual practice, the aluminum metal used is generally not of high purity because of economic factors. While this method of forming aluminum halide-hydrocarbon complexes is used in industry, it suffers the disadvantage that naphthenic and other nonaromatic compounds are formed along with the formation of the catalyst complex. When a catalyst complex containing these nonaromatic impurities is used as a catalyst in the alkylation of an aromatic compound, the nonaromatics will contaminate the alkylated aromatics produced by the alkylation reaction as well as the derivatives made therefrom. Since contamination of the alkylated aromatics with even small quantities of nonaromatics is undesirable, any change in catalysts which will result in a decrease of nonaromatic content is greatly to be desired.

It is an object of the present invention to provide an improved catalyst for the alkylation of aromatic compounds. It is also an object of the present invention to provide a method for the production of an improved alkylation catalyst. A further object of the present invention is to provide an improved process for the alkylation of alkylatable aromatic compounds. Additional objects will become apparent from the following description of the invention herein disclosed.

The present invention in one of its embodiments is a catalyst particularly useful for the alkylation of aromatic compounds, which catalyst has been formed by reacting an alloy comprising aluminum and copper with a hydrogen halide in a hydrocarbon medium. In another embodiment, the present invention is a process for the alkylation of an alkylatable aromatic compound which comprises contacting an alkylatable aromatic compound and an ethylenically unsaturated hydrocarbon under alkylating conditions with a complex catalyst formed by reacting an alloy comprising aluminum and copper with a hydrogen halide in a hydrocarbon medium.

The catalyst of the present invention is a complex catalyst formed by reacting an anhydrous hydrogen halide with an aluminum-copper alloy in a hydrocarbon medium. The nature of the catalyst so produced is not fully understood; however, it appears that aluminum is a sacrificial metal which reacts with the hydrogen halide and the hydrocarbons so as to form an aluminum halide-hydrocarbon complex which functions as the alkylation catalyst. Little or no copper is actually dissolved in the catalyst complex and its presence is necessary only to supress the hydrogenation of the aromatics and other side reactions which result in the formation of undesirable nonaromatic by-products during the formation of the catalyst complex. It should be emphasized that to reduce the nonaromatic by-product formation, the copper must initially be present as an alloy since a catalyst formed from mixtures of aluminum metal and pure copper metal in the form of powder or wire cuttings does not suppress nonaromatic formation. The hydrogen halide used in the formation of the complex catalyst is preferably hydrogen chloride, although hydrogen bromide and hydrogen fluoride are operative. Hydrogen fluoride is the least preferred hydrogen halide for the catalyst of the present invention.

The complex catalyst of the present invention may be formed in situ in the reaction vessel in which the alkylation reaction is to be carried out by placing the aluminum-copper alloy with the reactants and introducing anhydrous hydrogen halide therein. The complex may also be prepared outside the reaction vessel by reacting the aluminum-copper alloy with the hydrogen halide in a suitable hydrocarbon medium and then transferred to the reaction vessel for use in the alkylation reaction. The complex catalysts of the present invention are generally formed at temperatures from about 40–100° C. and higher, preferably about 75–85° C. The pressure should be sufficient to maintain the hydrocarbon used in the formation of the catalyst in the liquid phase. The aluminum halide content of the complex catalyst is generally in the range of 25 to 40 weight percent of the complex, preferably about 30 weight percent.

The alloy comprising aluminum and copper used to form the complex catalyst of the present invention generally contains aluminum and copper in the weight ratios of aluminum to copper within the range of 1:1 to 200:1. Preferred alloys contain from about 0.5% to about 12% by weight copper, i.e., weight ratios of aluminum to copper from 7:1 to about 200:1. Other metals such as magnesium, iron, manganese, zinc, silicon, sodium, etc., may also be present in the alloy in small amounts without significantly affecting the alkylation activity of the complex catalyst or the nonaromatics formation. Such metals are usually present in amounts of less than about 10% by weight.

Various hydrocarbons may be used in the formation of the complex catalysts of the present invention. The hydrocarbons may be aromatic or nonaromatic. If nonaromatic, the hydrocarbons may be saturated or unsaturated, straight-chain, branched chain, or cyclic in nature. Several nonlimiting examples of such compounds are ethane, butane, isobutane, neopentane, octane, 3-ethyl pentane, cyclohexane, ethylene, the pentenes, methylcyclohexane, cyclooctane, propylene tetramer and dodecene-1. The aromatic hydrocarbons useful in preparing the catalyst complexes of the present invention may be mononuclear or polynuclear and may be unsubstituted, i.e., benzene, or may be mono- or poly-substituted. Further, the substituted aromatic hydrocarbons may have either saturated or unsaturated substituents. Several nonlimiting examples of useful aromatic hydrocarbons are benzene, toluene, ethylbenzene, diethylbenzene, triethylbenzene, dimethylbenzene, styrene, hexyl benzene, naphthalene, indane, o-xylene, m-xylene, p-xylene, the ethyltoluenes, mesitylene, pentadecylbenzene, hexyltoluene, diphenyl, stilbene, anthracene, rubrene, and indane. Mixtures of different hydrocarbons may also be used. For a particular alkylation reaction, it is preferred to form the catalyst complex from the alkylate produced by that particular reaction. For example, if benzene is to be alkylated with ethylene so as to produce ethylbenzene, then ethylbenzene would be used to form the complex catalyst of the present invention. Of course, in commercial processes the alkylate from the alkylation of benzene with ethylene consists of not only ethylbenzene but is a mixture comprising ethylbenzene, benzene, diethylbenzene, triethylbenzene, etc. However, this mixture may also be used advantageously in the formation of the catalyst complex of the present invention.

The aromatics which may be alkylated according to the process of the present invention include both mononuclear and polynuclear aromatic compounds. These aromatics may be substituted with one or more substituents, which substituents may be saturated or unsaturated. It is understood, of course, that the aromatic compound must have at least one site on the aromatic nucleus which is available for alkylation. Several nonlimiting examples of aromatic compounds which may be alkylated according to the present invention are benzene, toluene, the xylenes, naphthalene, indane, ethylbenzene, the ethyltoluenes, styrene, 1,2,3-trimethylbenzene, mesitylene, normal propylbenzene, dodecylbenzene, pentadecyltoluene, diphenyl, diphenylmethane, fluorene, stilbene, naphthalene, anthracene, phenanthrene, naphthacene, rubrene, indane, and indene. The aromatic compounds which may be alkylated according to the present invention also include those having non-hydrocarbon substituents such as hydroxy, alkoxy, halide, nitro and other groups in addition to or instead of the hydrocarbon substituents. The present invention is most useful in the alkylation of mononuclear aromatic compounds having from six to twenty-one carbon atoms, which mononuclear aromatic compounds are preferably hydrocarbons. When a mononuclear aromatic hydrocarbon is to be alkylated, then it is preferred to use at least one mononuclear aromatic hydrocarbon for the formation of the complex catalyst of the present invention.

The alkylating compounds useful in the process of the present invention most often comprise hydrocarbons of 2 to 20 carbon atoms and containing ethylenic unsaturation. The ethylenically unsaturated hydrocarbons include for the purposes of the present invention, monoolefins, diolefins, triolefins, cycloolefins, and aromatic hydrocarbons containing ethylenically unsautrated substituents, e.g., styrene. Several nonlimiting examples of the ethylenically unsaturated hydrocarbons include ethylene, propylene, cis-butene-2, isopropylene, butylene, 2-methylbutene-1, isobutylene, trans-pentene-2, propylene tetramer, hexene-1, trans-hexene-2, dodecene-1, octadecene-1, octadecene-2, tetrapropylene, 1,4-hexadiene, 6-cyclohexyldodecene-1,6,10-dodecatriene. Usually alkylating compounds are the monoolefins containing 2 to 14 carbon atoms. The preferred alkylating compounds are the monoolefins of 2 to 4 carbon atoms, i.e., ethylene, propylene, butylene, isobutylene. The present invention is not limited to alkylating compounds nor alkylatable aromatics derived from any particular source nor to the purity of the alkylating compound or alkylatable aromatic.

The alkylation process of the present invention can be carried out in the gas phase but it is advantageous to operate in such a manner that at least a considerable part of the alkylatable aromatic hydrocarbons or the alkylation products are present in liquid phase in the reaction chamber. The process may be operated at temperatures between about 20° C. and lower to about 300° C. and higher. The preferred temperatures are within the range of 60° to 100° C. Generally, the pressures are selected so that at least a substantial part of the alkylatable aromatic hydrocarbon is liquid under reaction conditions. For example, pressures which are suitable may range between atmospheric and lower to 100 atmospheres and higher. The preferred pressures, however, range between atmospheric and ten atmospheres. The molar ratio of alkylatable aromatic to olefin is usually maintained within the range of from 1:1 to 10:1, preferably 1.5:1 to 2:1. The catalyst is generally present in amounts of about 0.1 to about 3 parts by weight per part alkylatable aromatic, preferably within the range of 1 to 2 parts by weight catalyst per part by weight of alkylatable aromatic.

Usually it is desirable to use promoters such as ethyl chloride or a hydrogen chloride in carrying out the process of the present invention. If used, the promoters will be added in small amounts to either the alkylatable aromatic or the olefin or the promoter may be added to the reaction mass itself for the purpose of accelerating the reaction. The amount of promoter such as hydrogen chloride ordinarily employed in the alkylation reaction may vary from a minimum of one part by weight per thousand parts of olefin to one part by weight for every 10 parts of olefin. Most beneficial results are obtained when a promoter to olefin weight ratio of 1:100 is employed.

Although the term "alkylation" has been used herein, it is to be understood that this term includes transalkylation reactions such as when a mixture of benzene and polyethylbenzenes undergoes transalkylation to form monoethylbenzene. The process of this invention is also applicable for methods where a polyalkylated aromatic compound is returned to the alkylation reaction where it serves to suppress the further formation of polyalkylated material and to direct the reaction to the formation of the monoalkylated product. The procedures for carrying out such reactions are well known and need no description herein.

The following example is given in order to illustrate but not to limit the present invention.

EXAMPLE

Several different catalyst complexes were formed by charging a stirred reactor with one mole of several different aluminum-containing alloys and one liter (867 grams) of ethylbenzene at 75° C. Some of the aluminum-containing alloys contained copper and the others did not. The aluminum-containing alloys charged to the stirred reactor were granular and generally between about 20 and 40 mesh in granular size. In each case, anhydrous hydrogen chloride was bubbled through the stirred reactor at a rate of 56 liters per hour, as measured at standard conditions, for 2½ to 3 hours or until all the aluminum in the aluminum-containing alloy was consumed. Most of the copper, magnesium and iron present in the various alloys did not dissolve but settled out so as to form a sediment on the bottom of the reactor. After all of the hydrogen chloride had been introduced, the mixture was allowed to separate into two phases, the lighter phase being mainly organic and the heavier phase being the catalyst complex. The catalyst complex phase consisted of about 28% aluminum chloride and 3% hydrogen chloride with the remainder being organic. The catalyst complex was then analyzed in order to determine the non-aromatic content thereof with the results being shown in the following table.

TABLE

| Alloy Composition, wt. percent | | | Non-Aromatic Content of Catalyst | |
|---|---|---|---|---|
| Al | Cu | Other Metals | Wt. percent | Gms. NA[1]/ 100 g. Al[2] |
| 91.6 | 1.8 | Mg (3) Fe (0.4) | 1.80 | 28.3 |
| 93.1 | 4.0 | Mg (1.5) Mn (0.6) | 1.06 | 17.5 |
| 88.8 | 7.9 | Zn (1.5) Fe (0.9) | 0.80 | 13.3 |
| 98.8 | 0.0 | Fe (0.2) Si (0.09) | 2.39 | 39.7 |
| 92.4 | 0.0 | Si (1) Fe (0.2) Na (0.1) | 2.17 | 38.7 |
| 99.8 | 0.0 | Fe (0.1) Si (0.1) | 2.68 | 44.4 |

[1] NA—Non-Aromatics.
[2] Ratio is based on 100 grams pure aluminum charged.

From this table it may be seen that a lower nonaromatic content was present in those catalyst complexes formed from the alloys containing copper than in those which were formed from alloys containing no copper. Each of these catalyst complexes were tested for alkylation activity by alkylating benzene with ethylene in the presence of a small amount of hydrogen chloride as a promoter. The benzene and ethylene were present in a mole ratio of benzene to ethylene of 2:1. Each alkylation was conducted in a continuous reactor approximately one inch in diameter and about 38 inches long. The reactor was packed with glass beads and contained about 100 cc. of complex catalyst during each run. The temperature of the reactor was maintained at about 85° C. and about atmospheric pressure. The benzene, ethylene gas, and the hydrogen chloride gas promoter were passed upward through the reactor during the alkylation. It was found that all of the catalyst complexes made from the aluminum alloys of the foregoing table were effective for the alkylation and were of about the same activity, each giving better than 95% conversion to ethylbenzene of the ethylene fed to the reactor.

What is claimed is:

1. A process for the alkylation of an alkylatable aromatic compound which comprises contacting an alkylatable aromatic compound and an ethylenically unsaturated hydrocarbon under alkylating conditions with a complex catalyst which has been formed by reacting an alloy comprising aluminum and copper with hydrogen halide in a hydrocarbon medium.

2. The process of claim 1 wherein said alkylatable aromatic compound comprises principally benzene and said olefin comprises principally ethylene.

3. The process of claim 1 wherein said alkylating conditions include a temperature in the range of 20 to 300° C. and pressures sufficient to maintain said alkylatable aromatic hydrocarbon in liquid phase.

4. The process of claim 3 wherein said alkylatable aromatic compound is a mononuclear aromatic hydrocarbon and said ethylenically unsaturated hydrocarbon is a mono-olefin containing from 2 to 4 carbon atoms.

5. The process of claim 4 wherein said alloy contains about ½ weight percent to about 12 weight percent copper and said hydrogen halide is hydrogen chloride.

6. The process of claim 5 wherein said alkylatable aromatic compound is benzene and said ethylenically unsaturated hydrocarbon is ethylene.

7. A process for the formation of a complex catalyst which comprises reacting an alloy comprising aluminum and copper with a hydrogen halide in a hydrocarbon medium.

8. The process of claim 7 wherein said alloy contains from about ½ to about 12% by weight copper.

9. The process of claim 7 wherein said hydrogen halide is hydrogen chloride and said hydrocarbon comprises at least one mononuclear aromatic hydrocarbon.

10. The process of claim 7 wherein said process takes place at temperatures between about 40° C. and 100° C.

No references cited.

DELBERT E. GANTZ, *Primary Examiner.*

C. R. DAVIS, *Assistant Examiner.*